United States Patent
Lindell

(10) Patent No.: US 10,797,866 B1
(45) Date of Patent: Oct. 6, 2020

(54) SYSTEM AND METHOD FOR ENFORCEMENT OF CORRECTNESS OF INPUTS OF MULTI-PARTY COMPUTATIONS

(71) Applicant: BAR-ILAN UNIVERSITY, Ramat Gan (IL)

(72) Inventor: Yehuda Lindell, Givat Shmuel (IL)

(73) Assignee: BAR-ILAN UNIVERSITY, Ramat Gan (IL)

( * ) Notice: Subject to any disclaimer, the term of this patent is extended or adjusted under 35 U.S.C. 154(b) by 0 days.

(21) Appl. No.: 16/833,697

(22) Filed: Mar. 30, 2020

(51) Int. Cl.
*H04L 9/08* (2006.01)
*H04L 9/06* (2006.01)
*H04L 9/32* (2006.01)

(52) U.S. Cl.
CPC ............ *H04L 9/083* (2013.01); *H04L 9/0656* (2013.01); *H04L 9/0869* (2013.01)

(58) Field of Classification Search
CPC ...... H04L 9/083; H04L 9/0656; H04L 9/0869
USPC ........................................................ 713/171
See application file for complete search history.

(56) References Cited

U.S. PATENT DOCUMENTS

| | | | | |
|---|---|---|---|---|
| 8,762,736 | B1* | 6/2014 | Goldwasser | H04L 9/003 235/375 |
| 9,906,511 | B1* | 2/2018 | Kolman | H04L 63/08 |
| 2012/0076302 | A1* | 3/2012 | Kolesnikov | H04L 9/3249 380/259 |
| 2014/0143764 | A1* | 5/2014 | Kerschbaum | G06F 8/437 717/143 |
| 2015/0341326 | A1* | 11/2015 | Premnath | H04L 63/062 713/171 |
| 2015/0349958 | A1* | 12/2015 | Lindell | H04L 9/3228 713/168 |
| 2015/0381349 | A1* | 12/2015 | Nikolaenko | G09C 1/00 713/189 |
| 2017/0359321 | A1* | 12/2017 | Rindal | G06Q 30/08 |
| 2018/0019868 | A1* | 1/2018 | Pe'er | H04L 9/14 |
| 2018/0196927 | A1* | 7/2018 | Pitel | H04W 12/0609 |
| 2018/0240100 | A1* | 8/2018 | Leleu | G09C 1/00 |
| 2018/0359082 | A1* | 12/2018 | Bos | H04L 9/30 |
| 2019/0042788 | A1* | 2/2019 | Cho | G06F 16/29 |

OTHER PUBLICATIONS

Robshaw et al., Advances in Cryptology—CRYPTO 2016: 36th Annual International Cryptology Conference, Aug. 14-18, 2016, Springer, pp. 565, 567, 578.*

* cited by examiner

*Primary Examiner* — Haresh N Patel
(74) *Attorney, Agent, or Firm* — Alphapatent Associates, Ltd; Daniel J. Swirsky

(57) ABSTRACT

A method of performing a Multi-Party Computation (MPC) process between two parties and a server, the parties generating initial garbled labels to an initial garbled circuit and sending the initial garbled labels corresponding to an input to the server, the parties generating a fresh garbled circuit and generating multiple bridge gates for translating the initial garbled labels to garbled values for the inputs to the fresh garbled circuit, where each of the bridge gates is associated with a specific input wire of the fresh garbled circuit and maps a value of the initial garbled labels to a value of garbled labels of the fresh garbled circuit, where the server computes fresh garbled values for the fresh garbled circuit using the bridge gates and the initial garbled values and evaluates the fresh garbled circuit using the fresh garbled labels.

8 Claims, 3 Drawing Sheets

SYSTEM AND METHOD FOR ENFORCEMENT OF CORRECTNESS OF INPUTS OF MULTI-PARTY COMPUTATIONS

FIELD

The present disclosure relates to enforcement of correctness for MPC inputs.

BACKGROUND

Secure multi-party computation (also known as secure computation, multi-party computation (MPC), or privacy-preserving computation) is a subfield of cryptography with the goal of creating methods for parties to jointly compute a function over their inputs while keeping those inputs private. Unlike traditional cryptographic tasks, where cryptography assures security and integrity of communication or storage and the adversary is outside the system of participants (an eavesdropper on the sender and receiver), the cryptography in this model protects participants' privacy from each other.

In some cases, the MPC processes involve splitting shares of secrets between different parties, and the security processes are satisfied without ever revealing the entire secret. This is enabled by exchanging information between the different parties, without relying on any trusted third party that can access the entire secret.

When one or more of the nodes is attacked or otherwise controlled by an adversary, the MPC process ensures that nothing can be learned. However, MPC in general does not guarantee that the input provided by an adversarially-controlled party during the MPC process is correct. Thus, such a party may provide an incorrect input and damage the entire MPC process. In applications where this is a problem there is a need to verify that the input from the parties is correct and no party is malicious or attacked.

SUMMARY

In one aspect of the invention a method is provided of performing a Multi-Party Computation (MPC) process between two parties and a server, the method including an initialization phase including the two parties generating initial garbled labels to an initial garbled circuit, each of the two parties sending the initial garbled labels corresponding to an input from each of the two parties to the server. The method also includes an evaluation phase including the two parties generating a fresh garbled circuit, the two parties generating multiple bridge gates for translating the initial garbled labels to garbled values for the inputs to the fresh garbled circuit, wherein each bridge gate of the multiple bridge gates is associated with a specific input wire of the fresh garbled circuit, wherein each bridge gate of the multiple bridge gates maps a value of the initial garbled labels to a value of garbled labels of the fresh garbled circuit. The method also includes the two parties sending the garbled circuit and bridge gates to the server, the server computing fresh garbled values for the fresh garbled circuit using the bridge gates and the initial garbled values and the server evaluating the fresh garbled circuit using the fresh garbled labels.

In some cases, the bridge gates encrypt a garbled value representing "0" on a wire with a garbled value representing "0" in the initial garbled values, and like encrypt a garbled value representing "1" on a wire with a garbled value representing "1" in the initial garbled values.

In some cases, the initialization phase further includes of the server storing the initial garbled labels corresponding to the inputs of the first party and the second party.

In some cases, the initialization phase further includes the first party sending a commitment of its initial garbled labels to the second party without revealing the garbled labels, the second party sending a commitment of its initial garbled labels to the first party without revealing the garbled labels. In such case, the evaluation phase further includes the first party sending the server the commitment to the second party's initial garbled labels and the commitment opening to its own garbled labels, the second party sending the server the commitment to the first party's initial garbled labels and the commitment opening to its own garbled labels, the server using the commitment openings to open the commitments and obtain the initial garbled values of the first party and second party.

In some cases, the commitment to the initial garbled labels is the result of a hash function applied to the initial garbled labels.

In some cases, the initialization phase including the first party generating an initialization seed for a pseudorandom generator, the first party sending the initialization seed to the second party, each of the two parties computing initial garbled labels based on the same initialization seed.

In some cases, the evaluation phase including the first party generating a fresh seed for the pseudorandom generator, the first party sending the fresh seed to the second party, each of the two parties computing a garbled circuit based on the fresh seed.

In some cases, the method further including the server sending the output to the first party.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The invention, in embodiments thereof, discloses a method for verifying correctness of inputs of a Multi-Party Computation (MPC) process between two parties. The verification is performed using a third party, such as a server communicating with the two parties. The third party can verify that it received the correct garbled circuit by checking that it received the same garbled circuit from both parties.

Each of the parties comprises a memory storage configured to store a share of the secret and a set of instructions utilized to implement the methods elaborated below. Each of the parties also comprises a communication module configured to exchange information with at least one of the other parties. each of the parties also comprises a processing module for processing information based on the set of instructions stored in the memory storage.

Figure 1:
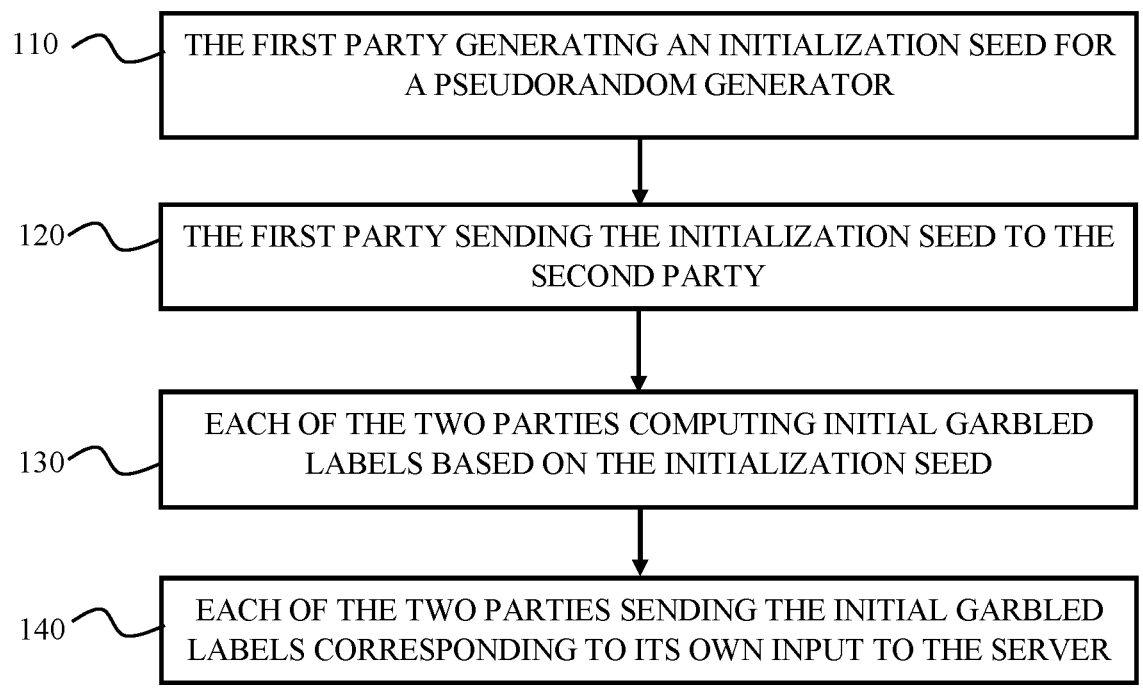
FIG. 1 discloses an initialization phase of a method for performing a Multi-Party Computation (MPC) process between two parties and a server, according to exemplary embodiments of the invention.

FIG. 1 discloses an initialization phase of a method for performing a Multi-Party Computation (MPC) process between two parties and a server, according to exemplary embodiments of the invention.

Step 110 discloses the first party generating an initialization seed for a pseudorandom generator. The initialization seed may be a string having a predefined length. The string may be generated using a random process.

Step 120 discloses the first party sending the initialization seed to the second party. Sending the initialization seed may be performed by sending a message over the internet, via a wired cable or via a cellular modem. The initialization seed may be stored in a predefined memory address in the memory of the second party.

Step 130 discloses each of the two parties computing initial garbled labels based on the initialization seed. The garbled circuit may be computed as disclosed in U.S. patent Ser. No. 10/178,090. The initial garbled labels may be computed using an MPC process. The garbled labels of both parties should be identical.

Step 140 discloses each of the two parties sending the initial garbled labels corresponding to its own input to the server. Sending the seed may be performed by sending a message over the internet, via a wired cable or via a cellular modem. The memory of the server, also denoted as the third party, may have one memory address allocated for the initial garbled labels received from the first party and a second memory address allocated for the initial garbled labels received from the second party. The server stores the initial garbled labels, and uses them every time that the correctness of the MPC input is enforced.

Figure 2:
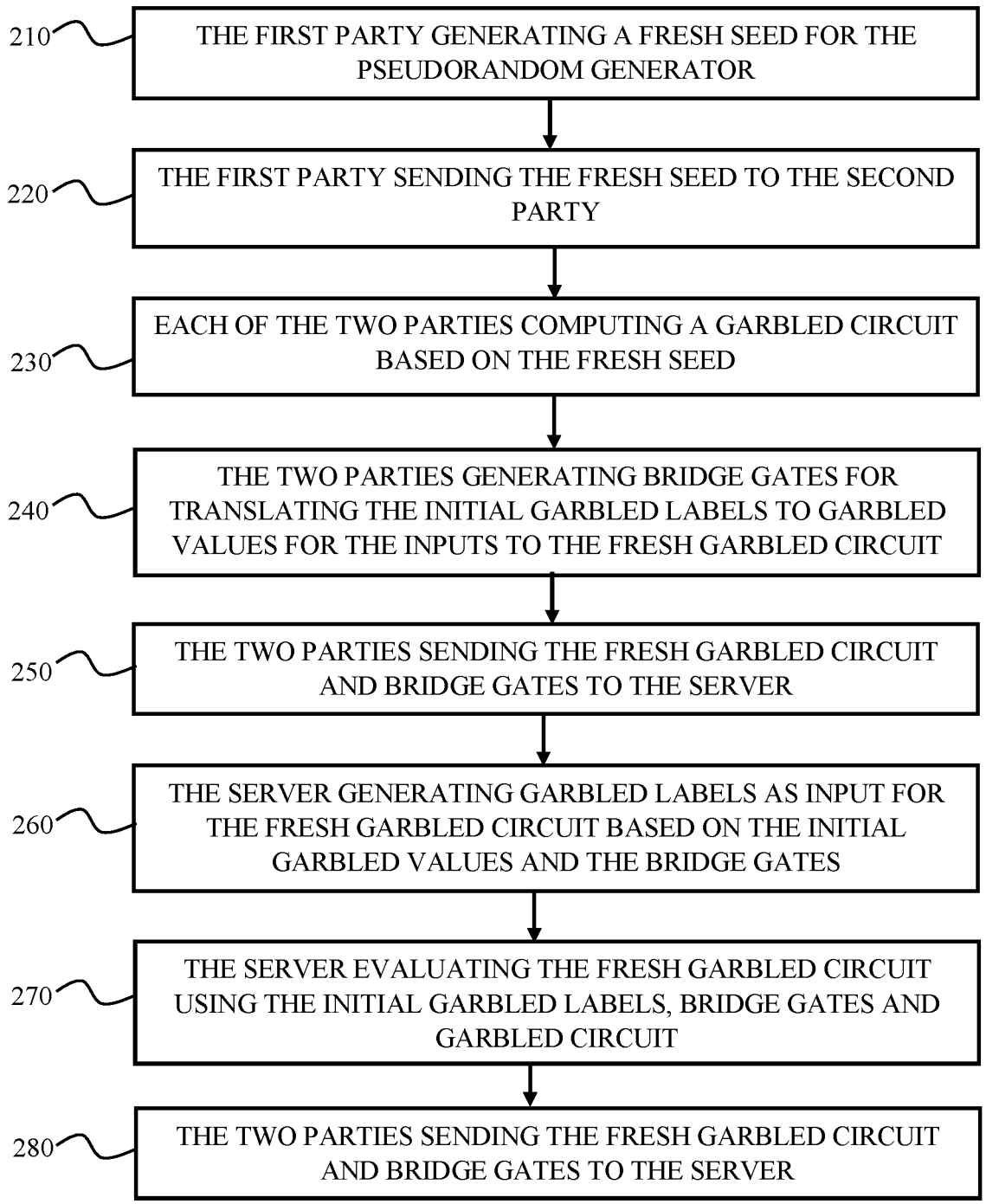
FIG. 2 discloses an evaluation phase of a method for performing a Multi-Party Computation (MPC) process between two parties and a server, according to exemplary embodiments of the invention.

FIG. 2 discloses an evaluation phase of a method for performing a Multi-Party Computation (MPC) process between two parties and a server, according to exemplary embodiments of the invention.

Step 210 discloses the first party generating a fresh seed for the pseudorandom generator. The fresh seed may be a string having a predefined length. The string may be generated using a random process. The fresh seed may be generated after or prior to generation of the seed of step 110.

Step 220 discloses the first party sending the fresh seed to the second party. Sending the seed may be performed by sending a message over the internet, via a wired cable or via a cellular modem.

Step 230 discloses each of the two parties computing a fresh garbled circuit based on the fresh seed. Computing the fresh garbled circuit may be performed in the same manner as the initial garbled circuit is computed in step 130. The fresh Garbled circuit need new inputs from the parties each time a fresh Garbled circuit is used.

Step 240 discloses the two parties generating bridge gates for translating the initial garbled labels to garbled values for the inputs to the garbled circuit. In some exemplary cases, each bridge gate of the multiple bridge gates is associated with a specific input wire of the fresh garbled circuit. Each input wire of the fresh garbled circuit is associated with a specific bridge gate of the multiple bridge gates, and the specific bridge gate comprises a ciphertext of the bit representing the input wire, either 0 or 1.

In some exemplary cases, each bridge gate of the multiple bridge gates maps a value of the initial garbled labels to a value of garbled labels of the fresh garbled circuit. The multiple bridge gates may be generated based on a predefined set of computerized instructions. The predefined set of instructions may consider properties of the fresh garbled circuit, such as number of input wires of the fresh garbled circuit.

In some exemplary cases, the multiple bridge gates encrypt the garbled value representing "0" on a wire with a garbled value representing "0" in the initial input garbled values, and encrypt the garbled value representing "1" on a wire with a garbled value representing "1" in the initial input garbled values.

Step 250 discloses the two parties sending the garbled circuit and multiple bridge gates to the server. Sending the garbled circuit and multiple bridge gates may be performed by sending a message over the internet, via a wired cable or via a cellular modem. The garbled circuit and multiple bridge gates may be stored in a predefined memory address in the memory of the server.

Step 260 discloses the server generating garbled labels as input for the garbled circuit based on the initial garbled values and the bridge gates.

Step 270 discloses the server evaluating the garbled circuit using the initial garbled labels, bridge gates and garbled circuit. evaluating the garbled circuit may be performed by methods known to persons skilled in the art, for example as elaborated in U.S. patent Ser. No. 10/178,090.

Step 280 discloses the server sending the output to the first party. Sending the output may be performed by sending a message over the internet, via a wired cable or via a cellular modem. The output may be stored in a predefined memory address in the memory of the first party.

Figure 3:
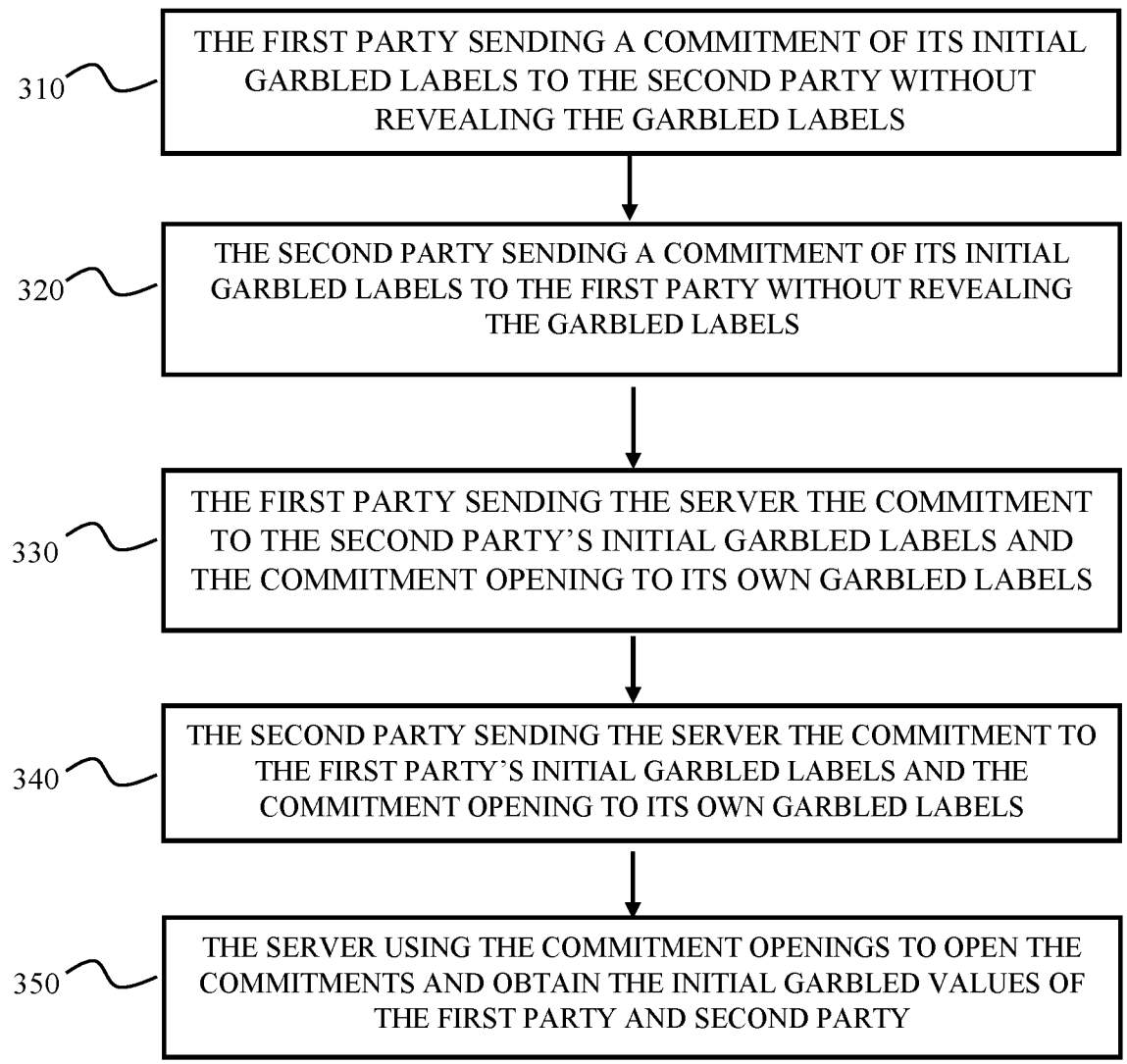
FIG. 3 discloses usage of commitments during an evaluation phase of a method for performing a Multi-Party Computation (MPC) process between two parties and a server, according to exemplary embodiments of the invention.

FIG. 3 discloses usage of commitments during an evaluation phase of a method for performing a Multi-Party Computation (MPC) process between two parties and a server, according to exemplary embodiments of the invention.

Step 310 discloses the first party sending a commitment of its initial garbled labels to the second party without revealing the garbled labels. The commitment is defined as a value that bounds the node to the value but does not reveal it. The commitment may be computed, for example, by choosing a random $r_i$ of length 128 bits and computing $c_i = SHA256(Q_i', r_i)$. Then, the nodes exchange the value $c_i$.

Step 320 discloses the second party sending a commitment of its initial garbled labels to the first party without revealing the garbled labels. Exchange of the commitments, commitment openings and additional messages between the nodes may be performed via a wired or wireless channel.

Step 330 discloses the first party sending the server the commitment to the second party's initial garbled labels and the commitment opening to its own garbled labels. The commitment openings may be the commitment message before the hash function is applied thereto. For example, the commitment opening is $(Q_i', r_i)$ while the commitment message is $c_i = SHA256(Q_i', r_i)$.

Step 340 discloses the second party sending the server the commitment to the first party's initial garbled labels and the commitment opening to its own garbled labels.

Step 350 discloses the server using the commitment openings to open the commitments and obtain the initial garbled values of the first party and second party.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed invention not be limited to the particular embodiments disclosed herein.

What is claimed is:

1. A method of performing a Multi-Party Computation (MPC) process between two parties and a server, the method comprising an initialization phase comprising:
   the two parties generating initial garbled labels to an initial garbled circuit;
   each of the two parties sending the initial garbled labels corresponding to an input from each of the two parties to the server;
   the method also comprises an evaluation phase comprising:
   the two parties generating a fresh garbled circuit;
   the two parties generating multiple bridge gates for translating the initial garbled labels to garbled values for the inputs to the fresh garbled circuit;
   wherein each bridge gate of the multiple bridge gates is associated with a specific input wire of the fresh garbled circuit;
   wherein each bridge gate of the multiple bridge gates maps a value of the initial garbled labels to a value of garbled labels of the fresh garbled circuit;
   the two parties sending the garbled circuit and bridge gates to the server;
   the server computing fresh garbled values for the fresh garbled circuit using the bridge gates and the initial garbled values;
   the server evaluating the fresh garbled circuit using the fresh garbled labels.

2. The method of claim 1, wherein the bridge gates encrypt a garbled value representing "0" on a wire with a garbled value representing "0" in the initial garbled values, and like encrypt a garbled value representing "1" on a wire with a garbled value representing "1" in the initial garbled values.

3. The method of claim 1, wherein the initialization phase further comprises of the server storing the initial garbled labels corresponding to the inputs of the first party and the second party.

4. The method of claim 1, wherein the initialization phase further comprises:
   the first party sending a commitment of its initial garbled labels to the second party without revealing the garbled labels;
   the second party sending a commitment of its initial garbled labels to the first party without revealing the garbled labels;
   and the evaluation phase further comprises:
   the first party sending the server the commitment to the second party's initial garbled labels and the commitment opening to its own garbled labels;
   the second party sending the server the commitment to the first party's initial garbled labels and the commitment opening to its own garbled labels;
   the server using the commitment openings to open the commitments and obtain the initial garbled values of the first party and second party.

5. The method of claim 4, wherein the commitment to the initial garbled labels is the result of a hash function applied to the initial garbled labels.

6. The method of claim 1, wherein the initialization phase comprising:
   the first party generating an initialization seed for a pseudorandom generator;
   the first party sending the initialization seed to the second party;
   each of the two parties computing initial garbled labels based on the same initialization seed.

7. The method of claim 6, wherein the evaluation phase comprising:
   the first party generating a fresh seed for the pseudorandom generator;
   the first party sending the fresh seed to the second party;
   each of the two parties computing a garbled circuit based on the fresh seed.

8. The method of claim 1, further comprising the server sending the output to the first party.

\* \* \* \* \*